US012606488B2

(12) United States Patent
Nelo et al.

(10) Patent No.: US 12,606,488 B2
(45) Date of Patent: Apr. 21, 2026

(54) ELECTROCERAMIC COMPOSITE MATERIAL AND METHOD OF MANUFACTURING IT

(71) Applicant: Oulun yliopisto, Oulu (FI)

(72) Inventors: Mikko Nelo, Oulu (FI); Tuomo Siponkoski, Oulu (FI); Jari Juuti, Oulu (FI); Heli Jantunen, Oulu (FI)

(73) Assignee: OULUN YLIOPISTO, Oulu (FI)

( * ) Notice: Subject to any disclaimer, the term of this patent is extended or adjusted under 35 U.S.C. 154(b) by 955 days.

(21) Appl. No.: 17/784,254

(22) PCT Filed: Dec. 10, 2020

(86) PCT No.: PCT/FI2020/050827
§ 371 (c)(1),
(2) Date: Jun. 10, 2022

(87) PCT Pub. No.: WO2021/116531
PCT Pub. Date: Jun. 17, 2021

(65) Prior Publication Data
US 2023/0054481 A1 Feb. 23, 2023

(30) Foreign Application Priority Data

Dec. 13, 2019 (FI) ..................................... 20196082

(51) Int. Cl.
C04B 35/465 (2006.01)
C04B 35/462 (2006.01)
(Continued)

(52) U.S. Cl.
CPC ........ C04B 35/462 (2013.01); C04B 35/4682 (2013.01); C04B 35/62625 (2013.01);
(Continued)

(58) Field of Classification Search
CPC .......... B29C 2037/90; B29C 2037/903; C04B 35/462; C04B 35/465; C04B 35/468;
(Continued)

(56) References Cited

U.S. PATENT DOCUMENTS

| | | |
|---|---|---|
| 6,168,746 B1 | 1/2001 | Chatterjee et al. |
| 2008/0075866 A1 | 3/2008 | Petrovsky et al. |

(Continued)

FOREIGN PATENT DOCUMENTS

| | | |
|---|---|---|
| CN | 102165021 | 8/2011 |
| CN | 102390979 | 3/2012 |

(Continued)

OTHER PUBLICATIONS

International Search Report for PCT/FI2020/050827 dated Mar. 15, 2021 (4 pages).
(Continued)

*Primary Examiner* — Leo B Tentoni
(74) *Attorney, Agent, or Firm* — Nixon & Vanderhye PC

(57) ABSTRACT

A method of manufacturing ceramic composite material comprises forming a combination of flowable metal oxide precursor (102), which is water-insoluble, and electroceramic powder (104) for covering surfaces of the electroceramic particles (500) with the metal oxide precursor (102), the electroceramic powder (104). A major fraction of the particles (500) has particle diameters within a range 50 μm to 200 μm, and a minor fraction of the particles has diameters smaller than the lower limit of said range, the major fraction having a variety of particle diameters. Then pressure 100 MPa to 500 MPa is applied to said combination, and said combination is exposed, under the pressure, to a heat treatment, which has a maximum temperature within 100° C. to 500° C. for a predefined period for forming the ceramic composite material.

11 Claims, 4 Drawing Sheets

(51) Int. Cl.

| | |
|---|---|
| *C04B 35/468* | (2006.01) |
| *C04B 35/472* | (2006.01) |
| *C04B 35/475* | (2006.01) |
| *C04B 35/49* | (2006.01) |
| *C04B 35/491* | (2006.01) |
| *C04B 35/495* | (2006.01) |
| *C04B 35/497* | (2006.01) |
| *C04B 35/499* | (2006.01) |
| *C04B 35/626* | (2006.01) |
| *C04B 35/645* | (2006.01) |
| *C04B 40/02* | (2006.01) |
| *C04B 41/00* | (2006.01) |
| *B29C 37/00* | (2006.01) |

(52) U.S. Cl.
CPC ...... *C04B 40/0259* (2013.01); *C04B 41/0072* (2013.01); *B29C 2037/90* (2013.01); *B29C 2037/903* (2013.01); *C04B 2235/3232* (2013.01); *C04B 2235/3234* (2013.01); *C04B 2235/3244* (2013.01); *C04B 2235/3248* (2013.01); *C04B 2235/3249* (2013.01); *C04B 2235/3251* (2013.01); *C04B 2235/3255* (2013.01); *C04B 2235/5436* (2013.01); *C04B 2235/5463* (2013.01); *C04B 2235/5472* (2013.01); *C04B 2235/602* (2013.01); *C04B 2235/604* (2013.01); *C04B 2235/6567* (2013.01); *C04B 2235/768* (2013.01)

(58) Field of Classification Search
CPC . C04B 35/4682; C04B 35/472; C04B 35/475; C04B 35/49; C04B 35/491; C04B 35/495; C04B 35/497; C04B 35/499; C04B 35/645; C04B 2235/3232; C04B 2235/3234; C04B 2235/3244; C04B 2235/3248; C04B 2235/3249; C04B 2235/3251; C04B 2235/3255; C04B 2235/5436; C04B 2235/5472; C04B 2235/602; C04B 2235/604; C04B 2235/6567

USPC ...................... 264/40.1, 40.3, 40.6, 109, 125
See application file for complete search history.

(56) References Cited

U.S. PATENT DOCUMENTS

| | | | |
|---|---|---|---|
| 2010/0130346 A1 | 5/2010 | Laine et al. | |
| 2012/0245016 A1* | 9/2012 | Curry ...................... | C08K 3/30 977/773 |
| 2017/0088471 A1 | 3/2017 | Randall et al. | |
| 2019/0185382 A1 | 6/2019 | Bolvari et al. | |

FOREIGN PATENT DOCUMENTS

| | | |
|---|---|---|
| CN | 103299375 | 9/2013 |
| CN | 104781214 | 7/2015 |
| CN | 108137417 | 6/2018 |
| WO | 2012/145122 | 10/2012 |
| WO | 2019/002695 | 1/2019 |

OTHER PUBLICATIONS

Written Opinion of the ISA for PCT/FI2020/050827 dated Mar. 15, 2021 (8 pages).
Nelo, M. et al. "Upside-down composites: Electroceramics without sintering" Applied Materials Today. Dec. 31, 2018., vol. 15, pp. 83-86 (5 pages).
Kahari, H. et al. "Room-temperaturefabricationofmicrowavedielec tricLi2MoO4—TiO2 Compositeceramics" Ceramics International. Apr. 15, 2016., vol. 42, pp. 11442-11446 (5 pages).
Search Report for Finnish Patent Application No. 20196082 dated Jun. 9, 2020 (2 pages).
Office Action issued on Nov. 16, 2022 in corresponding Chinese Application No. 202080086012.4, 14 pages.
Dec. 15, 2023 Search Report issued in European Patent Application No. 20899768.4, pp. 1-8.

* cited by examiner

ELECTROCERAMIC COMPOSITE MATERIAL AND METHOD OF MANUFACTURING IT

This application is the U.S. national phase of International Application No. PCT/FI2020/050827 filed Dec. 10, 2020 which designated the U.S. and claims priority to FI 20196082 filed Dec. 13, 2019, the entire contents of each of which are hereby incorporated by reference.

FIELD

The invention relates to electroceramic composite material and a method of manufacturing it.

BACKGROUND

Ceramic materials are used in a wide range of industries, including mining, aerospace, medicine, refinery, food and chemical industries, packaging science, electronics, industrial and transmission electricity, and guided lightwave transmission. In composite materials made from metal and ceramics, a metallic substrate material is reinforced with ceramic hardened particles. This makes it possible to combine the low weight of the metal with the resistance of ceramics. Ceramic composite materials may be used for the manufacture of electronic components. Electronic components may be active components such as semiconductors or power sources, passive components such as resistors or capacitors, actuators such as piezoelectric or ferroelectric actuators, or optoelectronic components such as optical switches and/or attenuators.

Aqueous solution of lithium molybdate ($Li_2MoO_4$) powder or the like has been used as a binder when making ceramic composite materials. However, the water solubility of the aqueous solution limits the manufacture and/or use of the ceramic composites. Additionally, there is also a pressure to improve the electric and/or optic properties of the composites. Hence, there is a need to improve the ceramic material and its manufacture.

BRIEF DESCRIPTION

The present invention seeks to provide an improvement in the ceramic material and its manufacturing.

The invention is defined by the independent claims. Embodiments are defined in the dependent claims.

LIST OF DRAWINGS

Example embodiments of the present invention are described below, by way of example only, with reference to the accompanying drawings, in which FIG. 1 illustrates an example of an apparatus for manufacturing the electroceramic composite material;

DESCRIPTION OF EMBODIMENTS

The following embodiments are only examples. Although the specification may refer to "an" embodiment in several locations, this does not necessarily mean that each such reference is to the same embodiment(s), or that the feature only applies to a single embodiment. Single features of different embodiments may also be combined to provide other embodiments. Furthermore, words "comprising" and "including" should be understood as not limiting the described embodiments to consist of only those features that have been mentioned and such embodiments may also contain features/structures that have not been specifically mentioned. All combinations of the embodiments are considered possible if their combination does not lead to structural or logical contradiction.

It should be noted that while Figures illustrate various embodiments, they are simplified diagrams that only show some structures and/or functional entities. The connections shown in the Figures may refer to logical or physical connections. It is apparent to a person skilled in the art that the described apparatus may also comprise other functions and structures than those described in Figures and text. It should be appreciated that details of some functions, structures, and the signalling used for measurement and/or controlling are irrelevant to the actual invention. Therefore, they need not be discussed in more detail here.

Figure 1:
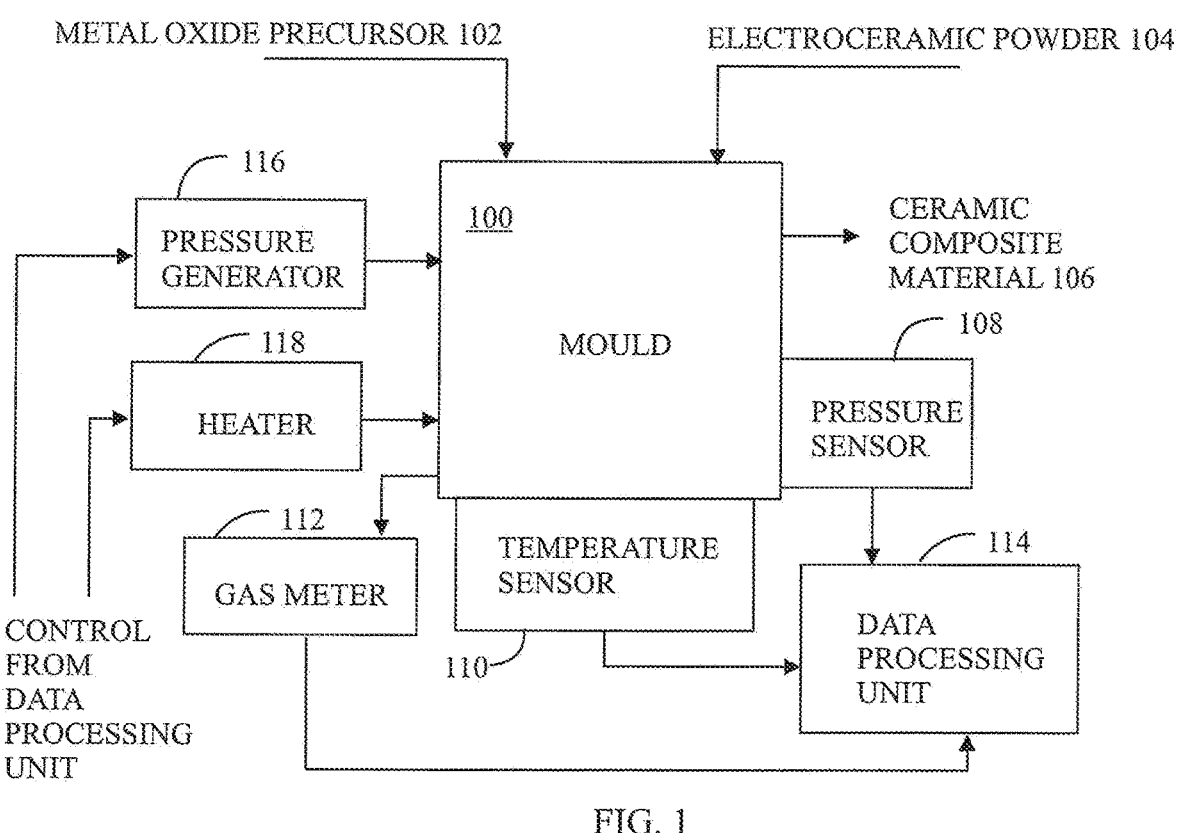

FIG. 1 illustrates an example of how to manufacture ceramic composite material. A mould 100 receives flowable metal oxide precursor 102 and electroceramic powder 104. The flowable metal oxide precursor 102 is water-insoluble, which means that the flowable metal oxide precursor 102 does not dissolve in water. The flowable metal oxide precursor 102 may comprise organometal. In an embodiment, the flowable metal oxide precursor 102 may comprise organotitanate, for example.

The mould 100 may receive the flowable metal oxide precursor 102 and electroceramic powder 104 separately, as shown in FIG. 1. A combination of flowable metal oxide precursor 102 and electroceramic powder 104 may be formed in the mould 100. The electroceramic powder 104 includes electroceramic particles 500 that have a variety of particle diameters, and the metal oxide precursor will cover the surfaces of the electroceramic particles 500.

Figure 2:
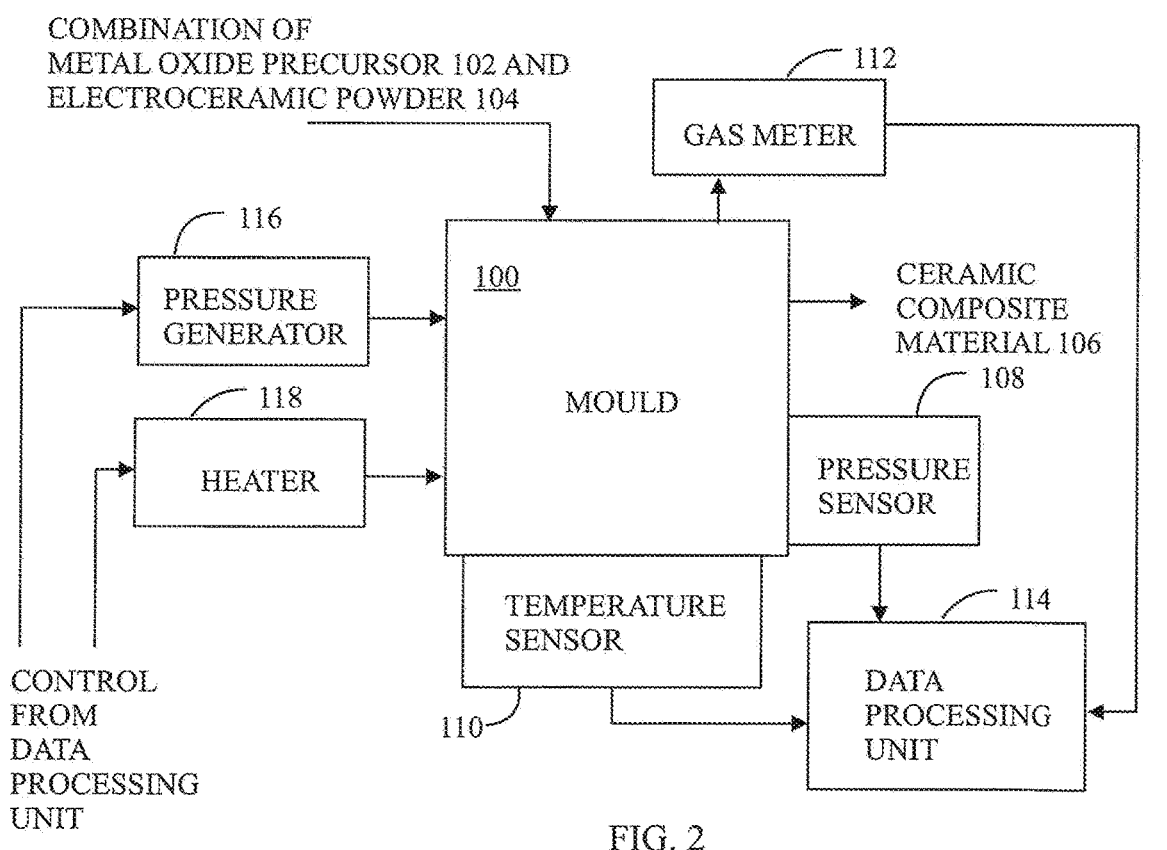
FIG. 2 illustrates another example of an apparatus for manufacturing the electroceramic composite material.

FIG. 2 illustrates an example where the combination of the flowable metal oxide precursor 102 and the electroceramic powder 104 is fed into the mould 100. That is, the combination may be made prior to its input in the mould 100. The combination may be a mixture, which is mixed before the input into to mould. The mould 100 may be an anti-adhesive mould, for example.

Figure 3:
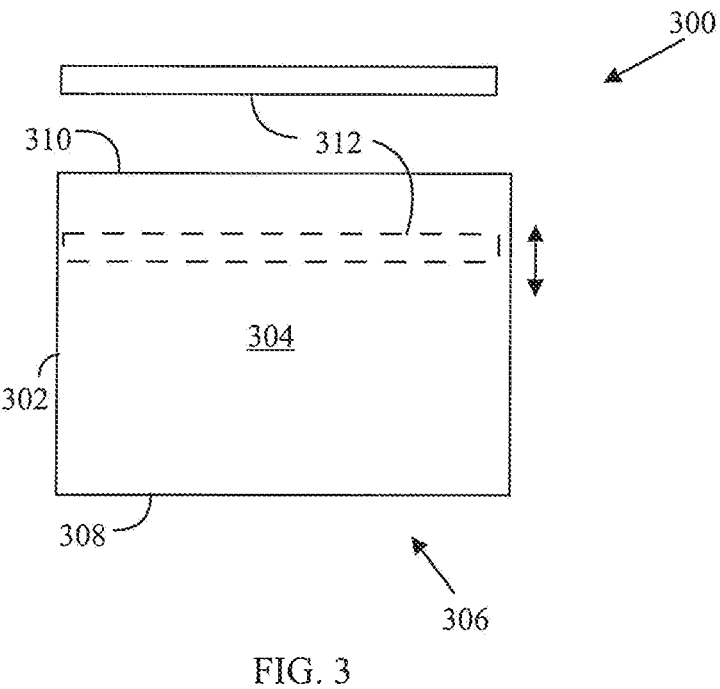
FIGS. 3 and 4 illustrate examples of a mould.
Figure 4:
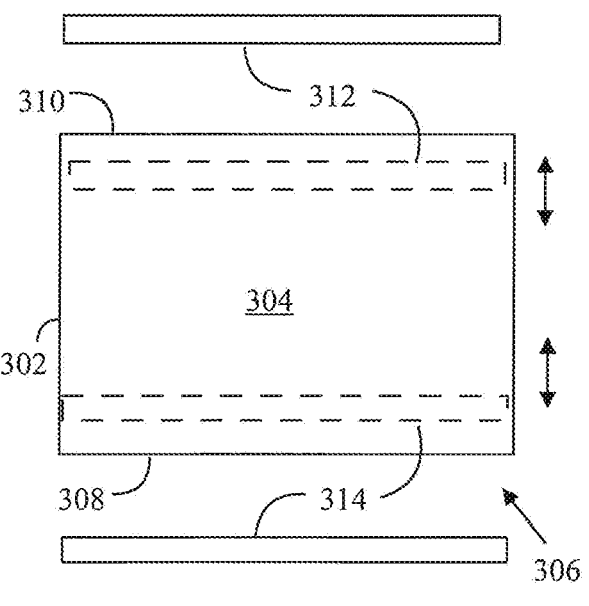

FIG. 3 illustrates an example of the mould 100. The mould 100 may comprise a structure 300, whose walls 302 form a cavity 304 therewithin. A cross-section of the structure 300 may be cylindrical, ellipse, rectangle or square, for example, without limiting to these shapes. A first end 306 of the structure 300 may be closed with an upper or a lower wall 308, when the cavity 304 is in an upright position. A second end 310 may have a piston 312, which may be removed for inserting the flowable metal oxide precursor 102 and the electroceramic powder 104 or their combination into the mould 100. The pressure may be applied by moving the piston 312 into the cavity 304 and the pressure may be increased by moving the piston 312 deeper into the cavity 304. In an embodiment an example of which is illustrated in FIG. 4, also the first end 310 may also be closed with a piston 314. Then the pressure may be generated by moving both of the pistons 312, 314 inwards the cavity 304. The arrows beside the dashed pistons 312, 314 illustrate the movement inside the cavity 304.

Figure 5:
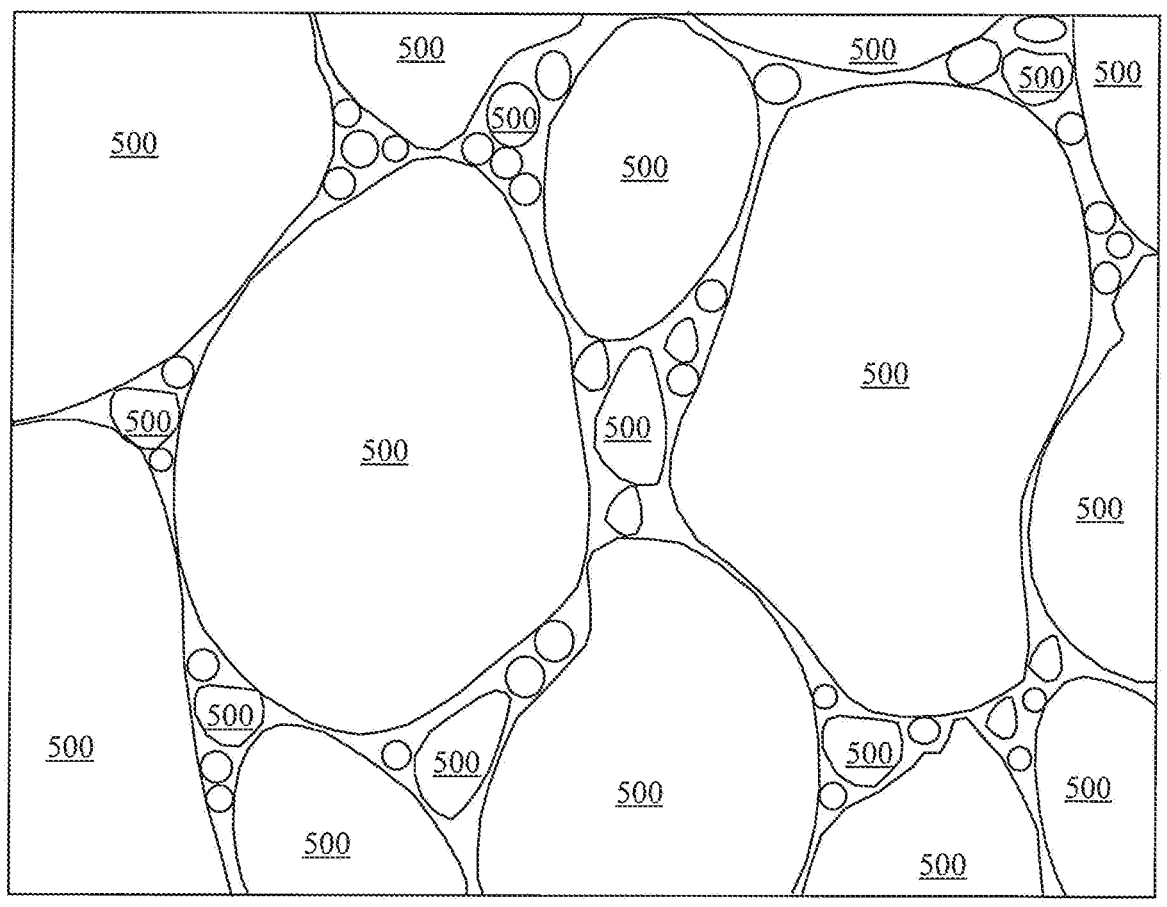
FIG. 5 illustrates an example of flowable metal oxide precursor and electroceramic powder.

FIG. 5 illustrates an example of a cross section of the electroceramic powder. The actual particles 500 have a three dimensional form and they fill space.

A major fraction of the particles 500 has particle diameters within a range 50 μm to 200 μm. A minor fraction of the particles has particle diameters smaller than the lower limit of said range, the lower limit being 50 μm. The major fraction has a variety of particle diameters. The minor fraction of particles may also have a variety of particle diameters.

The electroceramic particles 500 have a particle diameter distribution ranging between 1 μm and 200 μm, for example. The particles 500 can be divided into fine and coarse fractions. The coarse fraction is the major fraction, and the coarse fraction may contain 60 mass-% to 90 mass-% of the total mass of all the particles 500. The unit "mass-%" may alternatively be marked also as "wt-%" but both refer to a percentage of mass that corresponds to percentage of weight. A diametrical variation of the particles 500 of the coarse fraction is within a range 50 μm to 200 μm, a measured diameter being the largest diameter of each of the coarse particles 500. The fine fraction contains then the rest of the particles 500. The fine fraction is the minor fraction. That is, the fine particles may make 10 mass-% to 40 mass-% of the total mass of all the particles 500. A diametrical variation of the fine particles 500 may be within a range 1 μm to 20 μm, a measured diameter being the largest diameter of each of the fine particles 500. In an embodiment, a particle of the minor fraction may have a diameter which is one fifth (⅕) of a diameter of a particle of the major fraction.

Having the distribution of different sizes of particles 500, the electroceramic powder will tightly fill the space.

The particles of the electroceramic powder 104 may be screened through at least one sieve or otherwise filtrated correspondingly. The original distribution of the powder may have particles whose diameters have wider range than the pass band of the filtration. The original distribution of the powder may have particles whose diameters range 0.1 μm to 20000 μm, for example. A pass range of the screening or filtrating is about 50 μm to 200 μm for particles of the electroceramic powder 104. That is, the screening results in said coarse fraction. Because a mechanical screening or filtration is not perfect, particles of the electroceramic powder 104 outside said pass range may also exist in the electroceramic powder 104 to certain extent. The fraction outside the pass band of the filtration typically includes particles whose diameter is smaller than the lower limit of the filtration range. That is, the filtrated powder has also particles whose diameter is between 1 μm and 50 μm, which is the fine fraction. Often a mass-percentage of particles of the electroceramic powder 104 outside said pass range is lower than that of the fraction of the coarse particles, such as about 10 mass-% to 40 mass-%, for example. That is, a main part of the particles of the electroceramic powder 104 are within about 50 μm to 200 μm.

A total diametrical distribution of the particles 500 could be divided in the following size groups 5 μm-50 μm, 50 μm-100 μm, 100 μm-150 μm, 150 μm-200 μm. The amount of particles 500 in each group may be equal or flat in terms on vol-% or mass-% or it can selected to a form of a Gaussian curve or selected based on filling properties such that 20% of the particles 500 have a diameter between 5 μm-50 μm, 40% of the particles 500 have a diameter between 50 μm-100 μm, 30% of the particles 500 have a diameter between 100 μm-150 μm, and 10% of the particles have a diameter between 150 μm-200 μm, for example.

In FIG. 5, small electroceramic particles 500 have not been numbered because the number 500 is too large to put inside the borders of the smaller electroceramic particles 500. A suitable distribution of the electroceramic particles 500 allows an optimal packaging of the particles. That there are electroceramic particles in various diameter sizes all over the desired range also allows the flowable metal oxide precursor 102 to fill every gap between the electroceramic particles 500. The flowable metal oxide precursor 102 is between the electroceramic particles 500 and covers the surfaces of the electroceramic particles 500. The metal oxide precursor covers all surfaces of the particles 500 and a maximum thickness of precursor in any gap is less about 10 μm-20 μm. The maximum thickness of the precursor on a particle surface may be minimized as different sizes of particles 500 fill the space effectively.

In this manner, it is question of covering three-dimensional surfaces of the electroceramic particles 500.

A value of a diameter of a smallest particle fraction of particles 500 of a particle size distribution of the ceramic powder 104 may be in a range about 50 μm to about 100 μm, and a value of a diameter of a largest particle fraction of particles 500 of the particle size distribution of the ceramic powder 104 may be at least twice the diameter of the smallest particle. The diameter of the smallest particle fraction and the largest particle fraction are based on outer limits of the pass range of the screening or filtering.

Pressure, which ranges about 100 MPa to about 500 MPa, is applied to the combination of the flowable metal oxide precursor 102 and the electroceramic powder 104 in the mould 100 using the pressure generator 116 and the at least one piston 312, 314, for example. The combination under the pressure is also exposed to a heat treatment provided by the heater 118. The heat treatment has a maximum temperature within about 100° C. to about 500° C. for a predefined period for forming the electroceramic composite material 106, which can be taken out of the mould 100 after a final process step. In an embodiment, the heat treatment may have a maximum temperature within about 300° C. to about 500° C. for the predefined period.

The electroceramic composite material 106 has a high permittivity which allows the electric field to penetrate into the electroceramic composite material 106. The $d_{33}$-piezo-coefficient may be over 100, for example. In an embodiment, the $d_{33}$-piezocoefficient may be about 130, for example.

In an embodiment, the flowable metal oxide precursor 102 may transform into a ceramic material, which has at least approximately the same permittivity as the electroceramic particles 500, during or after the manufacturing process.

The end product of this process, electroceramic composite material 106, may be employed in a wide variety of electric, optical, and magnetic applications. The electroceramic composite material to be active i.e. may operate electro-optically, optoelectrocally, electromagnetically, magnetoelectrically, electromechanically, mechanoelectrically, electrothermically, thermoelectrically, electroacoustically and/or acousto-electrically, for example.

In an embodiment, the combination may be formed by mixing a percentage of the flowable metal oxide precursor 102 with a complement percentage of the electroceramic powder 104. In an embodiment, the percentages are volumetric percentages. The percentage of the flowable metal oxide precursor 102 may be X vol-%, where X vol-% is within a range about 10 vol-% to about 90 vol-%.

In an embodiment, the combination may be formed by mixing X vol-% of the flowable metal oxide precursor 102 with (100 vol-%–X vol-%) of the electroceramic powder 104.

In an embodiment, the combination may be formed by setting X vol-% at least approximately equal to 50 vol-%.

In an embodiment, the combination may be formed by adapting a percentage X vol-% of the flowable metal oxide precursor 102 to material of the electroceramic powder 104 that is used in the process. Then, a value of the percentage X vol-% of the flowable metal oxide precursor 102 may depend on the material of the electroceramic powder 104. Different materials of the electroceramic powders 104 have different surface properties, and equal sized particles of different materials can bind a different number of molecules at their surfaces.

In an embodiment, the combination may be formed by adapting X vol-% of the flowable metal oxide precursor 102 to the diameter distribution of the particles 500 of the electroceramic powder 104. The smaller the particles 500 of the electroceramic power 104 are, the higher percentage of the flowable metal oxide precursor 102 is used for the combination. Because the flowable metal oxide precursor 102 covers the particles 500 of the electroceramic powder 104 and a same volume of smaller particles has a larger surface, a higher percentage is required for smaller particles.

In an embodiment an example of which is illustrated in FIG. 1, a manufacturing apparatus of the ceramic composite material may comprise at least one pressure sensor 108, at least one temperature sensor 110, a gas meter 112 and/or a data processing unit 114. The manufacturing apparatus comprises also a pressure generator 116 and a heater 118. The pressure generator 116 may move either or both of the pistons 312, 314 in the cavity 304 in order to increase or decrease the pressure in the mould 100.

The at least one pressure sensor 108 may measure the pressure inside the mould 100. The at least one pressure sensor 108 may present the pressure data to a user. In an embodiment, the data processing unit 114 may receive the pressure data from the at least one pressure sensor 108. The data processing unit 114 may control the pressure generator 116 on the basis of the measured pressure data in order to cause the predetermined pressure in the mould 100. The at least one pressure sensor 108 may comprise a manometer, aneroid mechanical gauge, metal strain gauge, piezoresistive strain sensor, potentiometric sensor, and/or fiber optic sensor, for example.

The at least one gas meter 112 may measure the amount of gas that leaks out from the mould 100 during the process. The at least one gas meter 112 may present the gas data to a user. In an embodiment, the data processing unit 114 may receive the gas data from the at least one gas meter 112. The data processing unit 114 may control the pressure generator 116 on the basis of the measured gas data in order to cause the predetermined pressure in the mould 100. The at least one gas meter 112 may comprise a mechanical flow meter, a laminar differential pressure-based flow meter, an ultrasonic flow meter, an optical flow meter, variable area flow meter, a Coriolis flow meter, and/or a thermal flow meter, for example.

The at least one temperature sensor 110 may measure the temperature in the mould 100. The at least one temperature sensor 110 may present the temperature data to a user. In an embodiment, the data processing unit 114 may receive the temperature data from the temperature sensor 110. The data processing unit 114 may control the heater 118 on the basis of the measured temperature data in order to cause the predetermined temperature in the mould 100. Any or the at least one temperature sensor 110 may comprise a resistance temperature detector, a semiconductor sensor, a thermistor, an infrared detector and/or a thermocouple, for example.

In an embodiment, the pressure generator 116 may comprise an electric motor in order to move the at least one piston 312, 314, for example. In an embodiment, the pressure generator 116 may comprise compressed-air generator in order to move the at least one piston 312, 314, for example. In an embodiment, the pressure generator 116 may comprise hydraulic generator in order to move the at least one piston 312, 314, for example.

In an embodiment, the heater 118 may comprise an electric heater, for example. In an embodiment, the heater 118 may comprise a burner, which burns fuel in order to generate heat, for example.

Figure 6:
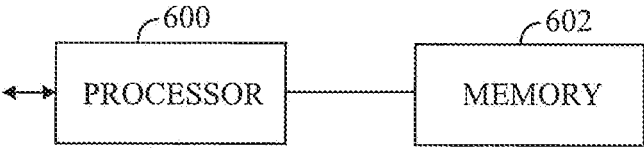
FIG. 6 illustrates an example of a data processing unit with at least one processor and at least one memory.

FIG. 6 illustrates an example of the data processing unit 114, which may comprise one or more processors 600, and one or more memories 602. The one or more memories 602 may include a computer program code. The one or more memories 602 and the computer program code are configured to, with the one or more processors 600, cause the manufacturing apparatus at least to perform the method steps.

In an embodiment, the combination of the metal oxide precursor 102 and the electroceramic powder 104/electroceramic particles 500 under the pressure may be kept in a temperature range 80° C. to 100° C. for a predefined interval of time of the heat treatment in order to remove solvent substance of the flowable metal oxide precursor 102.

In an embodiment, the combination of the metal oxide precursor 102 and the electroceramic powder 104/electroceramic particles 500 under the pressure may be kept in a temperature range 140° C. to 200° C. for a predefined interval of time of the heat treatment in order to remove solvent substance of the flowable metal oxide precursor 102.

Namely, the flowable metal oxide precursor 102 includes typically a solvent. The solvent may be organic, for example. The solvent may be isopropanol or the like, for example. The removal of the solvent decreases the volume occupied by material, which allows the pressure to compress the combination of the metal oxide precursor 102 and the electroceramic particles 500 into a smaller volume. An average distance between the electroceramic particles 500 becomes shorter which means a ceramic consistency of the combination increases. During this process step, the pressure may be kept constant. During this process step, the pressure may be varied in deterministic manner. During this process step, the pressure may be increased in a deterministic manner.

Then, the combination under the pressure may be kept in a temperature range 100° C. to 500° C. for the predefined period of the heat treatment in order to stabilize the ceramic composite material. In an embodiment, the combination under the pressure may be kept in a temperature range 300° C. to 500° C. for the predefined period of the heat treatment in order to stabilize the ceramic composite material. The flowable metal oxide precursor 102 crystallizes into a metal oxide on the surface of the electroceramic particles 500 and the molecules of the metal oxide and the electroceramic particles make a mechanical attachment and/or chemical bond therebetween. During this process step, the pressure may be kept constant. During this process step, the pressure may be varied in deterministic manner. During this process step, the pressure may be increased in a deterministic manner.

In an embodiment, a duration of the heat treatment is at least 10 minutes. In an embodiment, a duration of the heat treatment is about 30 minutes. In an embodiment, a duration of the heat treatment is about 40 minutes.

In an embodiment, a duration of the predefined interval of time is T minutes, and the predefined period is Z minutes. In an embodiment, Z is larger than T (Z>T). In an embodiment, T is larger than Z (T>Z).

In an embodiment, durations of Z and T equal in a range 10 min to 60 min. In an embodiment, durations of Z and T equal in a range 10 min to 30 min. In an embodiment, durations of Z and T equal in a range 30 min to 60 min.

In an embodiment, a duration of the predefined interval of time is about 10 minutes.

In an embodiment, a duration of the predefined interval of time is about 30 minutes.

In an embodiment, a duration of the predefined period is about 10 minutes.

In an embodiment, a duration of the predefined period is about 30 minutes.

In an embodiment, the combination under the pressure is cooled to a temperature equal to or lower than 100° C. during a predefined cooling period, which lasts at least 10 minutes. During this process step, the pressure may be kept constant. During this process step, the pressure may be varied in deterministic manner. During this process step, the pressure may be increased in a deterministic manner. During this process step, the pressure may be decreased in a deterministic manner. Within this process step, the temperature may be temporarily heightened.

In an embodiment an example of which is illustrated in FIG. 2, the flowable metal oxide precursor 102, which is in a form of gel, and the electroceramic powder 104 are mixed together prior to the application of the pressure. In a corresponding manner, the flowable metal oxide precursor 102 and the electroceramic powder 104 are mixed together prior to the application of exposure to the heat treatment. The flowable metal oxide precursor 102 may be in a form of sol-gel, for example.

By using the flowable metal oxide precursor 102 in the form of gel, it is dense, per se, and it is also possible to produce dense electroceramic composite material, which, in turn, tolerate a strong electric field. The gel form of the flowable metal oxide precursor 102 fills gaps between the particles of the electroceramic powder 104 effectively. The gel form of the flowable metal oxide precursor 102 has a low percentage of solvent, which thus forms a low amount of gas during vaporization under the thermal treatment. The low amount of gas, in turn, results in the electroceramic composite material of low or no porosity, which is dense.

In an embodiment, the electroceramic powder 104 includes at least one of the following: titanate material, niobate material and perovskite material. The titanate typically refers to titanate oxides, metatitanates and/or complex titanates. The metatitanate material has a chemical formula $MTiO_3$, where M may comprise a divalent metal, for example. An example of the complex titanate material bismuth titanate oxide $Bi_4Ti_3O_{12}$, for example.

The niobate refers to niobate oxides $ZNbO_3$, where Z may refers to a metal like lithium, potassium or strontium without limiting to these. Additionally, Z may refer to a combination of metals like lead magnesium niobate.

The perovskite material has a chemical formula $ABO_3$, where A may comprise at least one alkaline earth or rare-earth element and B may comprise at least one transition metal (such as Ag, Au, Cd, Co, Cr, Cu, Fe, Hf, Hg, Ir, La, Mn, Mo, Nb, Ni, Os, Pd, Pt, Re, Rh, Ru, Sc, Ta, Tc, Ti, V, W, Zn, Zr, Y, for example).

In an embodiment, the electroceramic powder 104 may include at least one of the following: lead zirconate titanate ($PbZrTiO_3$, PZT) powder, potassium sodium niobate ($KNaNbO_3$, KNN) powder, bismuth sodium titanate ($BiNaTiO_3$, BNT) powder, lead titanate oxide ($PbTiO_3$, PT) powder, lead niobate titanate oxide ($PbNbTiO_3$, PNT) powder, bismuth potassium titanate oxide ($BiKTiO_3$, BKT) powder, and strontium potassium niobate ($SrKNbO_3$, SKN) powder. The lead zirconate titanate may comprise PZ29™ PZ21™, PZ23™, PZ26™, and/or PZ36™, for example, which are commercial products.

In an embodiment, the electroceramic powder 104 may include at least one of the following: photovoltaic material, pyroelectric material, piezoelectric material and pyrovoltaic material. In an embodiment, the electroceramic powder 104 may comprise a mixture of different powders. Different electroceramic powders may have different electroceramic properties whereby allowing the electroceramic composite material to be used for a plurality of actions performed electro-optically, optoelectrocally, electromagnetically, magnetoelectrically, electromechanically, mechanoelectrically, electrothermically, thermoelectrically, electroacoustically and/or acoustoelectrically, for example.

Correspondingly, the metal oxide precursor 102 may include at least one of the following or become because of the exposure to the heat treatment under the pressure at least one of the following: photovoltaic material and pyrovoltaic material. In an embodiment, the metal oxide precursor 102 may comprise a mixture of different precursor materials. Different precursor materials may have different electroceramic properties, particularly after the exposure to the heat treatment under the pressure whereby allowing the electroceramic composite material to be used for one or more of actions performed electro-optically, optoelectrocally, electromagnetically, magnetoelectrically, electromechanically, mechanoelectrically, electrothermically, thermoelectrically, electroacoustically and/or acoustoelectrically, for example.

In an embodiment, electroceramic material content of the ceramic composite material is at least 30 vol-%.

An exemplary electroceramic composite material may be used for manufacturing of electronic components such as resistors, capacitors and other electronic components. Exemplary electroceramic composite materials may also be used in machine tools to substitute metal blades. Exemplary electroceramic composite materials may also be used in sensors to substitute conventional high temperature piezoelectric ceramics, and magnetic materials in ferrite applications, such as the core of the coils. Exemplary electroceramic composites may also be used at ceramic-metal interfaces, in biomedicine, as friction materials in brakes, in optoelectronic components, as substrate, as packaging and base materials for electronics and optics, and/or as splinter-proof in armoured vehicles.

An exemplary the ceramic composite material may be used for manufacturing of electronics and/or optoelectronics components. The components may include capacitors, coils, sensors, actuators, high frequency passive devices, energy storage and harvesting components, tuning elements, transformers, optical switches, antennas and/or optical attenuators, for example.

Figures 7, 8:
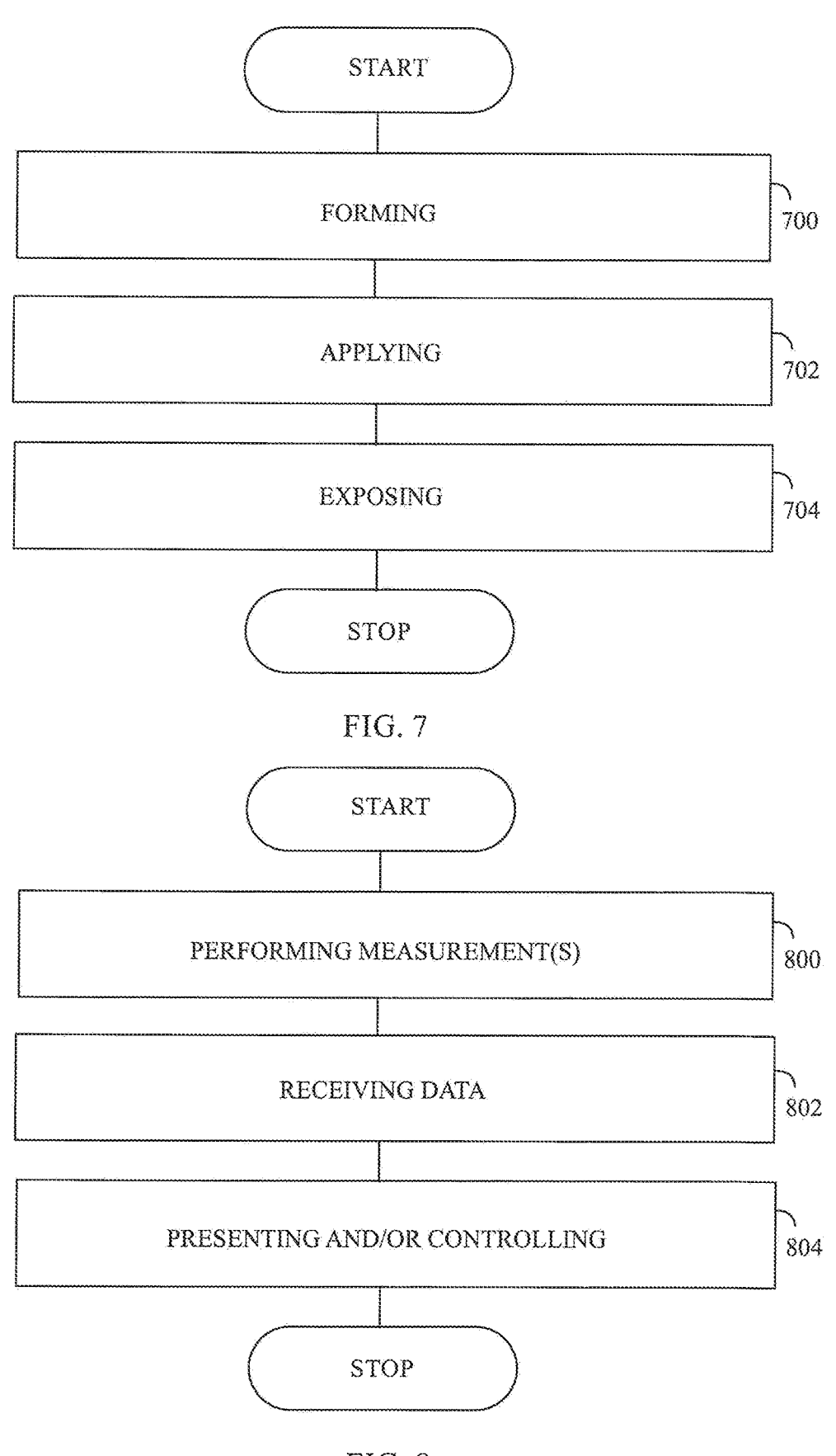
FIG. 7 illustrates of an example of a flow chart of a manufacturing method.
FIG. 8 illustrates an example of a flow chart of the manufacturing method utilizing at least one measurement and a data processing unit.

FIG. 7 is a flow chart of a manufacturing method. In step 700, a combination of flowable metal oxide precursor 102, which is water-insoluble, and electroceramic powder 104 is formed for covering surfaces of the electroceramic particles 500 with the metal oxide precursor 102, the electroceramic powder 104 having a variety of particle diameters within a particle diameter distribution ranging between 50 μm and 200 μm. In step 702, pressure 100 MPa to 500 MPa is applied to said combination. In step 704, said combination under the pressure is exposed to a heat treatment, which has a maximum temperature within 300° C. to 500° C. for a predefined period for forming the ceramic composite material 106.

FIG. 8 is a flow chart of the manufacturing method utilizing the measurement(s) and the data processing unit 114. In step 800, at least one of the following measurements are performed: measuring pressure in a mould 100, where the method is performed, by a pressure sensor 108, measuring temperature in the mould 100, where the method is performed, by a temperature sensor 110, measuring gas flow out of the mould 100, where the method is performed, by a gas meter 112. In step 802, data on the at least one measurement is received by a data processing unit 114. In step 804, at least one of the following is performed by the data processing unit 114: presenting the data of the at least one measurement, and controlling at least one of the following: heater 118 providing the heat treatment and pressure generator 116 providing the pressure under which the combination of the flowable metal oxide precursor 102 and electroceramic powder 104 are in the mould 100.

The low temperature (no sintering) manufacture enables an energy saving manufacture of the electroceramic composite component.

The method steps 702 and 704 shown in FIG. 7 may be controlled and the method steps 800 to 804 of FIG. 8 may be performed using a logic circuit solution or a computer program (see FIG. 6). The computer program may be placed on a computer program distribution means for the distribution thereof. The computer program distribution means is readable by a data processing unit 114, and it encodes the computer program commands, carries out the process steps and optionally controls the process steps on the basis of the measurements of the at least one sensor 108, 110, 112.

The computer program may be distributed using a distribution medium which may be any medium readable by the controller. The medium may be a program storage medium, a memory, a software distribution package, or a compressed software package. In some cases, the distribution may be performed using at least one of the following: a near field communication signal, a short distance signal, and a telecommunications signal.

It will be obvious to a person skilled in the art that, as technology advances, the inventive concept can be implemented in various ways. The invention and its embodiments are not limited to the example embodiments described above but may vary within the scope of the claims.

The invention claimed is:

1. A method of manufacturing ceramic composite material, the method comprising:

forming a combination of flowable metal oxide precursor, which is water-insoluble, and electroceramic powder, the metal oxide precursor covering surfaces of electroceramic particles, a major fraction of the particles having particle diameters within a range of 50 μm to 200 μm, and a minor fraction of the particles having diameters smaller than the lower limit of said range, the major fraction having a variety of particle diameters;

applying pressure of 100 MPa to 500 MPa to said combination; and exposing said combination under the pressure to a heat treatment, which has a maximum temperature within 300° C. to 500° C. for a predefined period to make a mechanical attachment and/or chemical bond between molecules of metal oxide of the metal oxide precursor and the electroceramic particles in order to form the ceramic composite material.

2. The method of claim 1, further comprising forming the combination by mixing a percentage of the flowable metal oxide precursor with a complementary percentage of the electroceramic powder, where the percentage of the flowable metal oxide precursor is within a range of 10 vol-% to 90 vol-%.

3. The method of claim 2, wherein the combination is formed by setting the percentage of the flowable metal oxide precursor at least approximately equal to 50 vol-%.

4. The method of claim 2, further comprising forming the combination by adapting the percentage of the flowable metal oxide precursor based on material of the electroceramic powder.

5. The method of claim 2, further comprising forming the combination by adapting the percentage of the flowable metal oxide precursor based on the diameter distribution of the particles of the electroceramic powder.

6. The method of claim 1, further comprising keeping the combination under the pressure in a temperature range of 80° C. to 100° C. for a predefined interval of time of the heat treatment in order to remove solvent substance of the flowable metal oxide precursor, and keeping the combination under the pressure in a temperature range of 100° C. to 500° C. for the predefined period of the heat treatment in order to stabilize the ceramic composite material.

7. The method of claim 1, wherein a duration of the heat treatment is at least 10 minutes.

8. The method of claim 1, further comprising cooling the combination under the pressure to a temperature equal to or lower than 100° C. during a predefined cooling period, which lasts at least 10 minutes.

9. The method of claim 1, further comprising mixing the flowable metal oxide precursor, which is in a form of gel, and the electroceramic powder prior to the application of the pressure.

10. The method of claim 1, wherein the electroceramic powder includes at least one of the following: titanate material and perovskite material.

11. The method of claim 1, further comprising:

performing at least one of the following measurements: measuring pressure in a mold by a pressure sensor, measuring temperature in the mold by a temperature sensor, and measuring gas flow out of the mold by a gas meter;

receiving data on the at least one measurement by a processor; and performing, by the processor, at least one of the following: presentation of the data of the at least one measurement, control of a heater providing the heat treatment, and control of a pressure generator providing the pressure under which the combination of the flowable metal oxide precursor and electroceramic powder are in the mold.

* * * * *